May 12, 1953  F. R. PAINTER  2,637,943
REALIGNING METHOD AND APPARATUS
Filed March 9, 1950  3 Sheets-Sheet 1
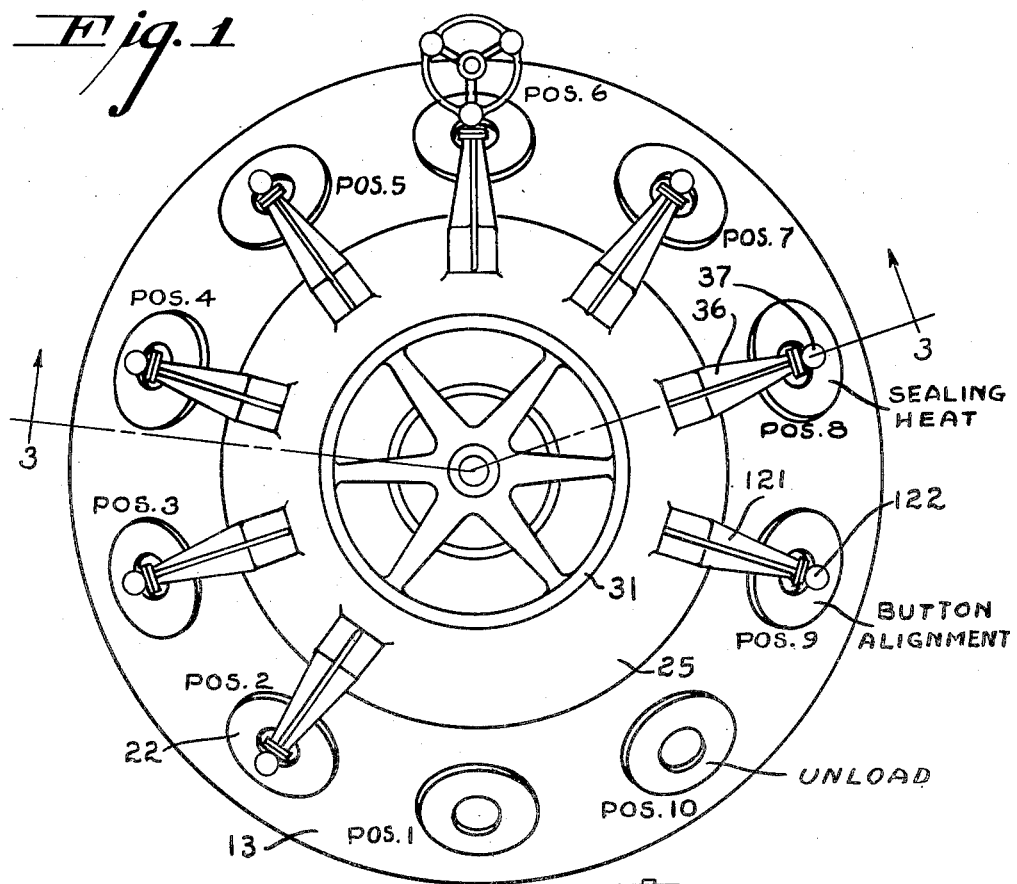
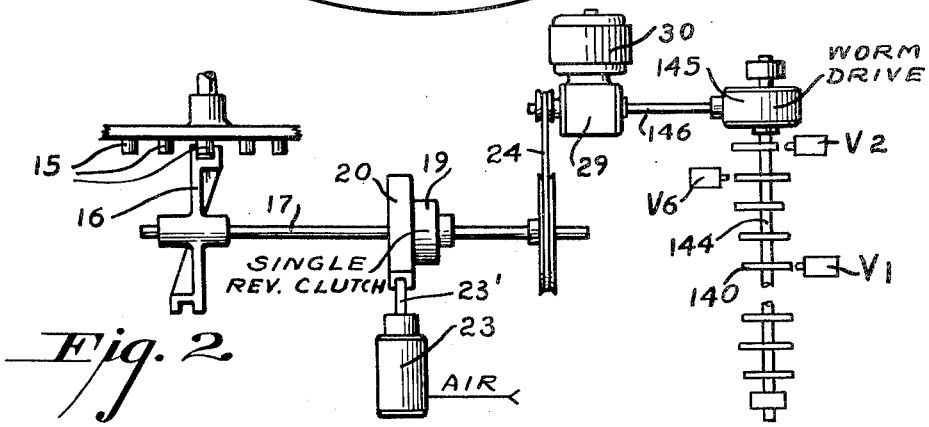
INVENTOR.
FRANCIS R. PAINTER
BY
ATTORNEY May 12, 1953 F. R. PAINTER 2,637,943
REALIGNING METHOD AND APPARATUS
Filed March 9, 1950 3 Sheets-Sheet 2

INVENTOR.
FRANCIS R. PAINTER
BY Rolf E. Schneider
ATTORNEY

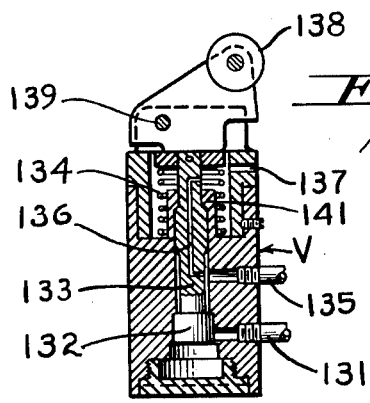
Fig. 5
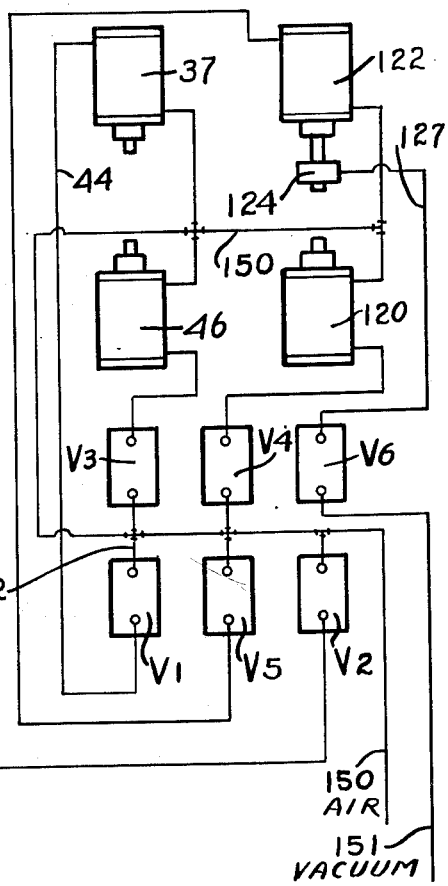
Fig. 6
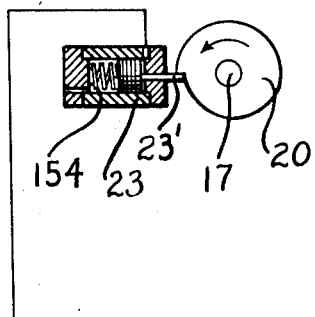

Patented May 12, 1953

2,637,943

UNITED STATES PATENT OFFICE 2,637,943

REALIGNING METHOD AND APPARATUS

Francis R. Painter, Corning, N. Y., assignor to Corning Glass Works, Corning, N. Y., a corporation of New York Application March 9, 1950, Serial No. 148,608

2 Claims. (Cl. 49—1)

1

The present invention relates to a realigning apparatus and is of particular utility in the realigning of an element, sealed into a wall of a glass article, while the glass adjoining the element is still in a workable condition following the sealing operation.

In the manufacture of glass cathode-ray tubes of the type now in general use in the television industry, such a tube is customarily provided with a conductive coating on its inner surface connected with a circuit outside the tube via an electrically conductive element, or the like, hereinafter referred to as a "button," sealed into the tube sidewall. Sealing is ordinarily accomplished by supporting the button on the glass of the sidewall bordering a perforation therethrough and applying heat to the button and the adjoining glass until the button is wet by the glass and becomes embedded in it as the glass reaches a predetermined softened condition. Some trouble is encountered, however, in that unless there is very accurate control of the application of heat during the sealing operation, the glass immediately surrounding the button sags an undesirable extent. In manually sealing in buttons it has been the usual practice to reach into the interior of the tube and in one manner or another raise the button and the surrounding softened glass to the desired position while the glass is still workable. Such a procedure is, however, impracticable if the sealing operation is to be effected automatically.

The object of the present invention, therefore, is the provision of an apparatus by means of which the button and the surrounding softened glass may be automatically seized and moved to a desired position while the surrounding glass is still workable.

A preferred form of apparatus embodying the invention is illustrated in the accompanying drawings, in which:

Fig. 1 is a diagrammatic view in plan of a form of such apparatus embodying a rotatable table.

Fig. 2 is a diagrammatic view showing the manner of indexing the table of Fig. 1 and the cam drive arrangement employed in initiating the indexing operation; in controlling the actuation of equipment at the sealing and button-aligning positions; and in controlling the connection and disconnection of a source of vacuum to a chuck employed to effect lifting of the button and the surrounding softened glass at the latter position.

2

Fig. 5 is a view, in sectional elevation, of one of a number of such valves actuated by the cams of Fig. 2.

Fig. 6 is a diagram, with certain elements shown in section, of the piping for the apparatus of Fig. 1.

Figure 3:
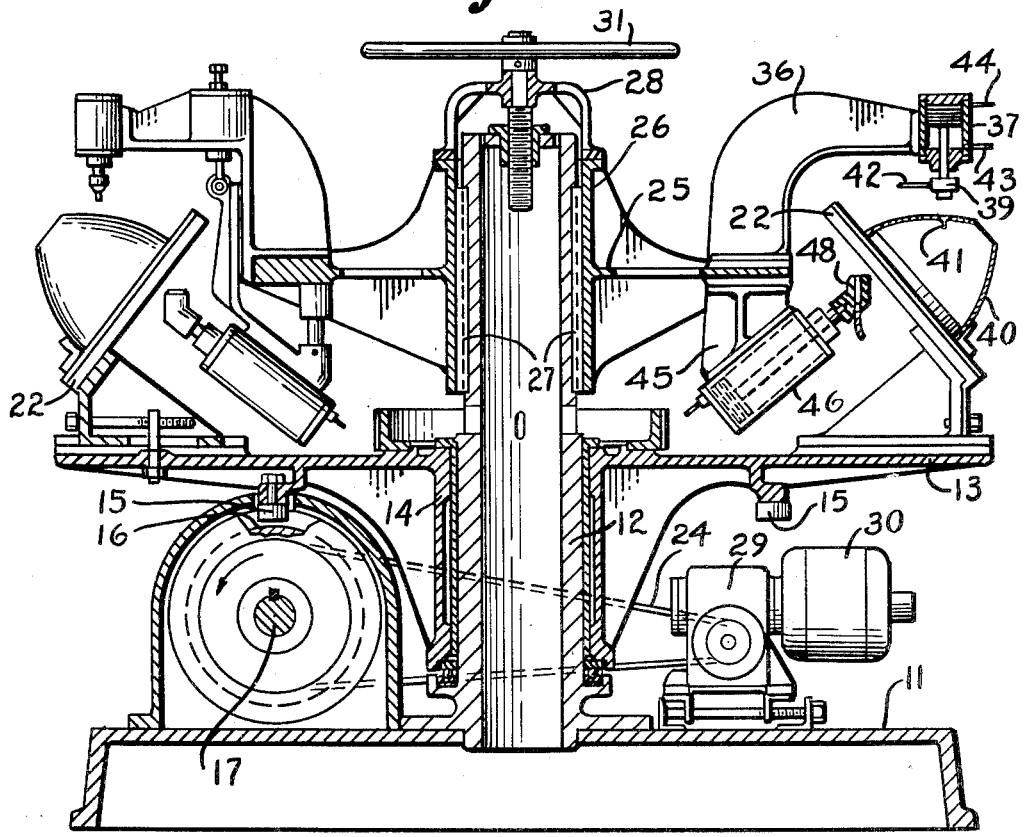
Fig. 3 is a sectional elevation taken generally on line 3—3 of Fig. 1.

Referring to the drawings in detail, and particularly to Fig. 3, 11 represents a base provided with a fixed vertical column 12. A table 13 has a hub 14 rotatable about column 12, and has depending rollers 15 by means of which the table is indexed by a cooperative indexing wheel 16 in a conventional fashion each time a shaft 17 supporting such wheel is rotated a single revolution. The precise method of indexing is best illustrated in Fig. 2, which illustrates wheel 16 as adapted to be periodically driven by means of a single revolution clutch 19 each time an associated pneumatic unit 23 is operated to release the clutch-driven ratchet disc 20. Rotation of the clutch 19 is effected by means of a belt 24 through a gear-reduction unit 28 continuously driven by a motor 30.

Arranged on table 13 are ten circular tube chucks 22 adapted to be successively indexed through positions 1 to 10 as designated in Fig. 1. Any or all of positions 2 to 9 may be provided with equipment supported on a turret 25 having a hub 26 surrounding the upper portion of column 12 and locked against relative rotary movement by keys 27. Such equipment may be that described and claimed in the pending application of Ray A. Hinkley, Serial No. 140,509, filed January 25, 1950. The hub 26 is suspended from a bell 28 which may be vertically moved by means of a hand wheel 31 to adjust the height of turret 25 to that most suitable for the size of ware carried by the chucks 22.

The present invention relates only to the equipment provided at positions 8 to 9. In position 8 a bracket 36 extends upward and outward from turret 25, and at its free end carries a differential-pressure pneumatic unit 37 having a projecting piston rod equipped with a burner 39 supplied with a combustion mixture by a flexible tube 42 and adapted to direct flames toward the wall area of a tube 40 having a perforation occupied by a button 41 to be sealed thereinto. The lower end of unit 37 is continuously supplied with air via a flexible tube 43 to maintain burner 39 in a retracted position except at such times that air is being supplied to the upper end of the unit via a flexible tube or conduit 44, as more fully explained hereinafter.

Carried on the underside of turret 25 by a bracket 45 is a second pneumatic unit 46, having on the free end of its piston rod a burner 48. As with the case of unit 37, the piston rod of unit 46 is normally held in its retracted position by fluid continuously supplied to its burner end. Unit 46 is adapted to advance burner 48 through a chuck 22 into close proximity of the inner-wall surface of a tube 40 opposite the surface toward which burner 39 is directed at such times that a chuck is indexed thereover.

A pneumatic unit 120 (Fig. 6) similar to unit 46 and provided with a burner 50 similar to burner 48, is provided at the button-aligning position (position 9). The button-aligning equipment at position 9 also includes a bracket 121 (Figs. 1 and 4), extending from turret 25 and provided with a differential-pressure pneumatic unit 122 similar to the unit 37, but equipped with a vacuum bell 124 adapted to be lowered by the unit into engagement with a tube 40 and over a sealed-in button, such as button 41, aligned thereunder whenever fluid is supplied to the upper end of the unit. Vacuum bell 124 is activated by connection of a vacuum source thereto at the proper time to pneumatically lift the button and the surrounding softened glass to their original position with respect to the unsoftened glass of the tube wall, as will be more fully described hereinafter. A face plate 125 on bell 124 initially spaced from the button 41 is encountered thereby and prevents its being lifted above the desired position.

*Timing*

Timing of the operations of pneumatic units 23, 37, 46, 120, and 122, and of the connection of vacuum to bell 124, is effected by means of like cam-actuated valves such, for example, as the valve V shown in Fig. 5. Valve V in its normal position blocks air supplied to its intake pipe 131 from passage therethrough by means of a member 132 of a slide 133 normally held in the position shown by a spring 134. On the other hand, at this position a pipe 135 for connection with an end of a pneumatic unit, such as unit 37, for example, is connected to atmosphere via a passage 136 through slide 133 and a passage 137 of the valve housing. Slide 133 is moved downward, having reference to Fig. 5, when a cam, such as, for example, cam 140 (Fig. 2) depressed a roller 138 carried by a slide actuator pivoted at 139. With slide 133 in the latter position, a portion 141 of the valve housing blocks passage 136, while member 132 opens a passage in the valve between pipes 131 and 135, thus admitting operating air to the end of the unit to which pipe 135 is connected.

Referring momentarily to Fig. 2, it will be noted that cam 140 and other similar cams for controlling the operation of the described pneumatic units are carried by a shaft 144 adapted to be continuously driven by motor 30 through a worm drive assembly 145 and a drive shaft 146 extending therefrom to the speed-reducing unit 29.

Referring now to Fig. 6, it will be observed that the forward end of each of the described pneumatic units 37, 46, 120 and 122 is normally supplied with air from supply line 150, whereby the pistons are normally maintained retracted within the units. Owing to greater exposed piston surface area available to air supplied in the rear ends of these units, they will advance their pistons whenever air is supplied to their rear ends, even though air continues to be supplied to their forward ends. Air is selectively supplied to the rear ends of the above-referred to units from supply line 150 via laterals thereof including valves individual to the units similar to valve V. For example, unit 37 is supplied with air over a path including lateral 152, valve V1 and conduit 44 at such time that the cam 140 (Fig. 2), associated with valve V1 operates it. In a like fashion air is selectively supplied to the rear ends of units 120 and 122 under control of their respective valves V4 and V5.

In a similar fashion control of the connection of the vacuum line 151 to bell 124 is under control of valve V6 in line 127.

Fluid is likewise supplied to the forward end of the table-indexing pneumatic unit 23 under control of a cam-actuated valve V2 to cause rod 23' to release cam 20 of the single-revolution clutch 19 (Fig. 2). Return of rod 23' is by means of a spring 154 when the supply of fluid to unit 23 is discontinued.

*Operation*

Following the arrival of a tube such as 40 at position 8 with a button such as 41 deposited in an aperture in the tube wall, units 37 and 46 under control of valves V1 and V3 advance their burners 39 and 48 toward opposite sides of button 41 and the surrounding glass to effect a seal therebetween. After the seal is completed, valves V1 and V3 are permitted to restore, thus enabling the restoration of burners 39 and 48 to their normal positions as shown in Fig. 3. Following restoration of burners 39 and 48, valve V2 is actuated and supplies operating fluid to pneumatic unit 23, thereby causing table 13 to index the chuck, supporting tube 40, from a position 8 to position 9.

Figure 4:
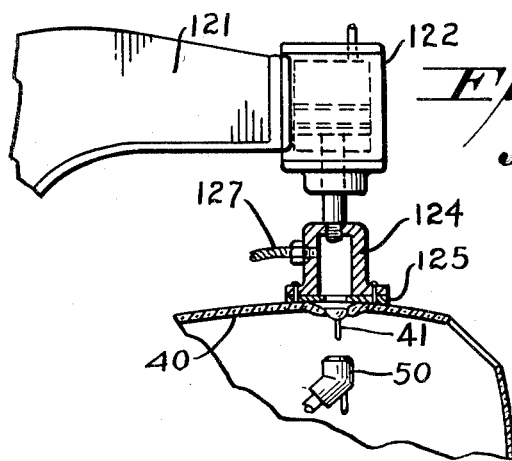
Fig. 4 is an enlarged, side-elevational view, partly in section, of the button-aligning equipment and a fragment of a tube, shown in section, having a button sealed therein.

In position 9, unit 120 (Fig. 6), under control of valve V4, moves its burner 50 to the position shown in Fig. 4 to apply annealing flames to the sealed-in button 41 and the surrounding glass, while unit 122, under control of valve V5, lowers bell 124 to the position shown in Fig. 4 over the button and the surrounding softened glass of tube 40. Under control of cam-actuated valve V6 the associated vacuum supply line 151 is momentarily connected via such valve and conduit 127 with bell 124, which thereby lifts the button and the surrounding workable glass to the desired positon with respect to the tube wall. A moment later valve V6 cuts off the vacuum supply from bell 124 and exhausts the chuck to atmosphere. Subsequently, unit 120 restores burner 50 to its normal position, while unit 122 raises bell 124 to its initial position. The path is thus cleared for the movement of the chuck and tube to the unloading position (position 10) during the subsequent indexing of table 13.

I claim:

1. A machine for sealing an electrically conductive element or the like into that wall portion of a glass article surrounding a perforation in which such element has been deposited, including means for heating the element and the article wall solely in the area immediately surrounding the perforation to soften such glass and effect a weld between it and the element but leaving the area outside of said first-mentioned area in unsoftened condition, the softening of the area immediately surrounding the perforation causing a displacement thereof from its desired position, a vacuum bell for restoring the softened glass and the element welded thereto to said desired position before the softened glass becomes set, said vacuum bell having an annular bottom surface of sufficient extent to engage the unsoftened glass, the softened glass surrounded thereby, and the element, means for moving said bell to bring its bottom surface into engagement with the unsoftened glass, and means for connecting a source of vacuum to said bell to pneumatically bring the softened glass and the element into engagement with its bottom surface.

2. The method of repositioning a metal button that has been fused to the glass immediately bounding an aperture through a glass article wall in which such button has been deposited, while such glass is still workable following fusion thereof to the button, said fusion resulting in the displacement of such workable glass from a desired position with respect to the unsoftened glass surrounding said workable glass, which comprises enclosing the side of the wall of the article opposite that from which the workable glass has been displaced within a confined space, the wall area within the confined space including the button and the workable glass fused thereto, the periphery of said confined space being on the annular portion of the unsoftened glass surrounding the workable glass, and reducing the pressure in such space to pneumatically restore the workable glass and the button to said desired position.

FRANCIS R. PAINTER.

References Cited in the file of this patent

UNITED STATES PATENTS

| Number    | Name    | Date          |
|-----------|---------|---------------|
| 2,059,767 | Bausch  | Nov. 3, 1936  |
| 2,398,525 | Gray    | Apr. 16, 1946 |
| 2,410,345 | Hinkley | Oct. 29, 1946 |
| 2,485,769 | Phelps  | Oct. 25, 1949 |
| 2,492,162 | Litton  | Dec. 27, 1949 |
| 2,494,870 | Greiner | Jan. 17, 1950 |